United States Patent [19]
Semenov et al.

[11] Patent Number: 5,822,353
[45] Date of Patent: Oct. 13, 1998

[54] SOLID-STATE LASER

[76] Inventors: Alexei A. Semenov, ul. Tvardovskogo, 18-2-341, Moscow 123458, Russian Federation; Vasily N. Karlov, ul. Mitinskaya, 52, Apartment 158, Moscow 123627, Russian Federation

[21] Appl. No.: 765,977

[22] PCT Filed: Jul. 18, 1994

[86] PCT No.: PCT/RU94/00153

§ 371 Date: Jan. 15, 1997

§ 102(e) Date: Jan. 15, 1997

[87] PCT Pub. No.: WO96/02965

PCT Pub. Date: Jan. 2, 1996

[51] Int. Cl.[6] .................................................. H01S 3/09
[52] U.S. Cl. ........................... 372/69; 372/39; 372/40; 372/70; 372/71; 372/51; 372/55
[58] Field of Search ................................ 372/39, 40, 41, 372/6, 43, 49, 66, 69, 70, 51, 55

[56] References Cited

U.S. PATENT DOCUMENTS

| | | | |
|---|---|---|---|
| 3,445,785 | 5/1969 | Koester et al. | 331/94.5 |
| 3,593,194 | 7/1971 | Paine et al. | 331/94.5 |
| 3,599,114 | 8/1971 | Snitzer et al. | 372/6 X |
| 3,906,396 | 9/1975 | Cooley | 331/94.5 |
| 3,978,427 | 8/1976 | Truscott | 372/40 X |
| 4,039,970 | 8/1977 | Shiroki et al. | 331/94.5 |
| 5,027,079 | 6/1991 | Desurvire et al. | 372/6 X |
| 5,038,358 | 8/1991 | Rand | 372/69 |
| 5,084,880 | 1/1992 | Esterowitz et al. | 372/6 |
| 5,084,890 | 1/1992 | Brierley | 372/40 |
| 5,369,523 | 11/1994 | Millar et al. | 359/341 |

FOREIGN PATENT DOCUMENTS

| | | | |
|---|---|---|---|
| 0427856A1 | 1/1990 | European Pat. Off. | 372/69 X |

OTHER PUBLICATIONS

Semenov, "Use of Ultraviolet Filters . . . ", Sov. J. Quantum Electron., pp. 635–637 (May 1988).
Freuchiger et al., "Laser Properties of Selectively Excited $YA1O_2$", Optics Letters, pp. 964–966 (Nov. 1988).
Breguet et al., "Comparison of Threshold Energy . . . ", IEEE J. Quantum Electronics, pp. 2563–2566 (Nov. 1992).
Dischler et al., "Investigation of the Laser Materials . . . ", J. Phys. D. Appl. Phys., pp. 1115–1124 (1984).
Datwyler et al., "New Wavelengths of the $YA1O_2$:Er Laser", IEEE J. Quantum Electronics, pp. 158–159 (Feb. 1987).
Klaus D. Hachfeld, "The Engineering Art of Solid State Laser . . . ", SPIE Flashlamp Pumped Laser Technology, pp. 55, 60–62, 65 & 74 (1986).

*Primary Examiner*—Brian Healy
*Attorney, Agent, or Firm*—James Creighton Wray; Meera P. Narasimhan

[57] ABSTRACT

A solid-state laser is proposed with an emission wavelength of greater than 1.4 μm to eliminate the risk of damage to human skin and eyes. The proposed laser comprises: an active medium alloyed with $Er^{3+}$ ions; an optical pumping source separated from the active medium by an additional filtering layer in the form of optical elements, and/or coating applied thereto, and/or a liquid medium, which intercept and eliminate ultraviolet radiation and are transparent to light in the excitation wavelength of the active medium. The cumulative internal transmission density of the filtering layer along the path of a given beam in the laser from the pumping source to the active medium, including the path in the casing of the pumping source, must be greater than 2 in the wavelength range below 320 nm and not more than 0.1 in the excitation spectrum of the active medium with wavelengths greater than 360 nm. Filtration in the laser is accomplished with the aid of, for example, a 0.3–1.5 μm thick film of cerium oxides applied to the surface of the transparent material of the laser components ($CeO_2$ accounting for not less than two thirds of the oxides in question) and/or using a liquid medium containing cerium compounds, e.g. based on an aqueous solution of the salts $CeCl_3$ and/or $CeBr_3$ with a sum molar concentration of $Ce^{3+}$ ions of at least 0.4 mol/l.

12 Claims, 1 Drawing Sheet

SOLID-STATE LASER

BACKGROUND OF THE INVENTION

The present invention relates to the field of quantum electronics, and more particularly to lasers emitting at wavelengths of above 1.4 μm.

DESCRIPTION OF THE PRIOR ART

Known are lasers using yttrium aluminum garnet (YAG) and yttrium aluminate (YAlO$_3$) crystals doped with trivalent erbium ions (Er$^{3+}$), in which, to reduce the threshold lasing energy at transitions between $^4I_{11/2}$ and $^4I_{13/2}$ levels at a wavelength of about 3 μm, wavelength-selective filters isolating the active element from the pumping lamps and absorbing the pumping light with wavelengths below 645 to 545 nm are used. These filters interposed between the active medium and the pumping light source comprising one or several lamps are made in the form of filtering additives either to the liquid medium surrounding the pumping light source lamp(s) and/or the active element ( J. "Optics Letters", vol. 13, No. 11, 1988, J. Frauchiger et al.: "Laser Properties of Selectively Excited YAlO$_3$:Er",p.p.964–966), or to the material of the optical component isolating the active medium from the pumping light source (IEEE J. Quant. Electr., vol. QE-28, No. 11, 1992, J. Breguet et al.: "Comparison of Threshold Energy of Selectively Excited YAlO$_3$:Er and YAG:Er Lasers", p.p. 2563–2566).

The use of such lasers at the propagation of their radiation through humid atmosphere over large distances is a matter of some difficulty because a considerable absorption in atmospheric water vapors is observed at their lasing wavelength of about 3 μm.

It is also known that lasing has been achieved in YAlO$_3$ crystals doped with Er$^{3+}$ ions in four-level operation at transitions between $^4S_{3/2}$ and $^4I_{9/2}$ levels at emission wavelengths between 1.6 and 1.8 μm which coincides with the high atmospheric transmission region ( J. "Phys. D: Appl.Phys.", vol. 17, 1984, B.Dishler et al.: "Investigation of the laser materials YAlO$_3$:Er and LiYF$_4$:Ho", p.p. 1115–1124).

In such solid-state lasers using an active medium based on erbium-doped YAG and YAlO$_3$ crystals the liquid medium isolating the pumping light source from the active medium comprises filters based on complex salts ( for example, NaNO$_3$) and on various organic compounds ( IEEE J. Quant. Electr., vol. QE-23, No.2, 1987, M. Datwyler et al.: "New Wavelengths of the YAlO$_3$:Er Laser", p.p. 158–159). These filters have transmission bands in the spectrum of the said salts and organic compounds over the UV wavelength range, which cause the active medium degradation. They do not provide the desired useful life of lasers because of incomplete UV filtering, due to which the lasers have a low efficiency and a high threshold pumping energy the minimum value of which is 34 to 55 J.

In the U.S. Pat. No. 4,039,970, 1977, H01S 3/092 is described a solid-state laser with a light filter, which comprises an active medium doped with erbium ions and a pumping light source with an envelope made of a pumping light-transmitting material, which is isolated from the active medium by a gaseous and/or liquid medium and/or optical components intercepting and removing the pumping light short-wavelength component with wavelengths below 500 nm. Such a laser has an enhanced lasing threshold, 50 J, at the output mirror transmittance of 5%, but insufficient lasing efficiency, 3 mJ, at a wavelength of 1.663 nm and a pumping energy of 100 J.

In the EP 0,427,856 A1, H01S 3/092 document is described a solid-state laser comprising short-wavelength radiation absorbing volume filters with a small content (up to 1.5%) of rare-earth metals, including cerium (Ce). Such filters have a low optical density in the UV part of the spectrum. This causes the active medium degradation photo-induced by UV radiation resulting in the formation of color centers which absorb the pumping radiation over the Er$^{3+}$ ion excitation range thus reducing the lasing efficiency and enhancing threshold pumping energy.

Known are lasers comprising protective coatings in the form of alternately arranged layers of CeO$_2$, silicon oxides and aluminum oxide (Al$_2$O$_3$) on the reflectors of not above 0.25 μm in thickness each, which are designed for protection of the reflector silver surfaces from the coolant (document SPIE vol. 609 Flashlamp Pump Laser Technology, 1988, Klaus D. Hachfeld: "The Engineering Art of Solid State Laser Pump Cavity Design", p.p. 55–77). These multilayer coatings have a high interference transmission selectivity at a strong dependence of reflection factor upon the light wavelength and incident angle. In case such coatings are used as filters, these properties cause a loss of the pumping light incident onto the coating surface at wide angle and spectral ranges. Because of the small CeO$_2$ layer thickness they insufficiently absorb the pumping light UV component, which fact prevents them from being used in Er$^{3+}$ lasers due to the active medium degradation. Moreover, all that reduces the efficiency and increases threshold pumping energy of the laser.

SUMMARY OF THE INVENTION

The basis of the invention is the task to devise a laser using Er$^{3+}$-doped active media with lasing wavelengths of 1.6 to 1.8 μm and/or 2.7 to 3.0 μm having enhanced efficiency and useful life and a reduced threshold pumping energy. The set task is achieved by that in a laser using a solid medium doped with trivalent erbium ions (Er$^{3+}$) the pumping light source with an envelope of a transparent material is isolated from the active medium by an additional filtering layer in the form of optical components and/or coatings thereon and/or a liquid medium intercepting and removing the radiation short-wavelength component, while being transparent over the active medium excitation range, so that the optical density of the filtering layer total over the full length of any ray path from the pumping source to the active medium, including the path in the pumping source envelope, should be at least 2 over the wavelength range below 320 nm and should not exceed 0.1 over the active medium excitation spectral bands of wavelengths above 360 nm. The given density D(λ) of at least 2 at λ<320 nm is determined by the fact that at a narrow pumping pulse ofτ~100 μs corresponding to the lifetime of the metastable state of the $^4S_{3/2}$ level of Er$^{3+}$ ions and at the required pumping intensity the UV component is greater than the remaining part of radiation by about 10 fold. In crystals and glasses, Er$^{3+}$ ions are associated with a great number of UV-sensitive color centers, including those based on Fe$^{2+}$ ions, which are formed under the action of light at λ=300 to 320 nm. This determines the long-wavelength spectral region cutoff with a high filter density at a wave-length of not below 320 nm. The filter density over the specified wavelength range should be such that intense UV radiation is attenuated by a factor of at least 100. For this purpose the filter transmission should not exceed 1%; that is, the filter density over the filter reject range should be at least 2. Such a filter density value can be practically measured with available spectrographic facilities during industrial application of the filter.

Therewithal, the $Er^{3+}$ ion excitation lines having the highest absorption factor and making the greatest contribution to excitation are in the 355 to 525 nm range, and at lasing from the $^4S_{3/2}$ level at the four-level scheme provide about 90% of the total pumping. At the three-level lasing scheme with $Er^{3+}$ ion pumping over the up to about 1.1 μm range the contribution of these lines reaches about 80%, while the contribution of lines in the 556 to 1100 nm region is about 12%. Therefore, a reduction of the filter transmission at the transmission cutoff should not cause the removal by absorption, reflection or conversion of more than 20% of the incident pumping light with a wavelength of 360 nm, and the transmission should increase up to about 95% as the wavelength increases. This satisfies the requirement for the filter density to be not more than 0.1 at a wavelength of 360 nm and makes it possible to utilize a maximum of the pumping light energy over the range of the most effective excitation of erbium ions. The full width of the transmission cutoff with the filter transmission changing from 0 to 80%, or the optical density from 2 to 0.1, should not exceed 40 nm. This enhances the efficiency and reduces the threshold pumping energy of four- and three—level $Er3^+$ lasers at wavelengths of 1.6 to 1.8 μm and 2.7 to 3.0 μm, respectively.

DETAILED DESCRIPTION OF THE PREFERRED EMBODIMENT

Figure 1:
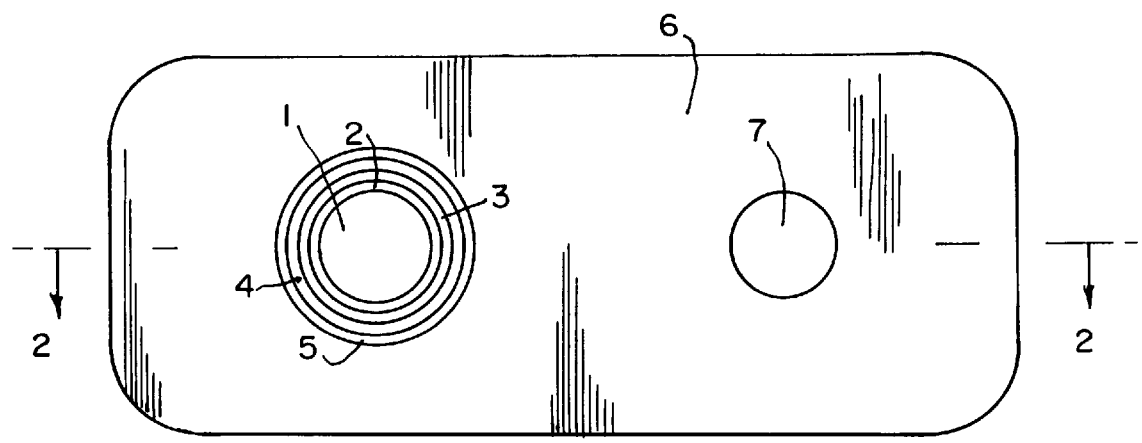
FIG. 1 is a schematic elevation of a preferred embodiment having a cylindrical pumping light source isolated from the active medium by filter coatings and a liquid medium.

The addition of the lengths of the light path sections from the pumping source to the active medium, with taking into account the spectral dependence of the material transmission factor on each section of the path, is required for determining the light energy loss in all media and/or materials of all optical components through which the light rays pass. The reflector may itself consist of one or several monolithic optical components of various shapes and may comprise optical components in the form of cylinders or flat plates of a transparent material isolating and/or surrounding the light source and/or the active medium. For various rays with various wavelengths the optical components may introduce different losses depending on the actual optical path of rays in them and on the spectral dependence of the absorption factor, but should not transmit radiation with wavelengths shorter than 320 nm, which causes the active medium degradation. The inclusion of the pumping light path inside the pumping source envelope into the total path length of any light ray from its source to the active medium is dictated by that in determining the total optical density of the filter layer the portion of light already removed in the light source envelope should be taken into account in order to prevent an uncontrolled shift of the total filter transmission cutoff into the wavelength region above 360 nm, in case the light source is changed or modernized, and to prevent the erbium ion excitation energy loss entailed with that; that is, in order to obtain a filter density of not exceeding 0.1 at a wavelength of 360 nm. The most effective is the application of a filter in the form of a uniform-thickness layer. This provides uniform removal of the UV component and uniform transmission of the pumping light for all rays passing through any filter areas. Besides, at the uniformity of the filtering dopant concentration, C, the uniformity of the filter thickness, d, allows to obtain a predetermined density, $D(\mu)=\epsilon(\mu)Cd$, proportional to the filter extinction, $\epsilon(\mu)$. In this case, the energy loss in the pumping light source envelope or in the coating can be readily taken into account. The non-uniformity of the absorbing filter thickness requires accurate checking of the optical density, $D(\mu)$, and a high standard of technique of changing the filter extinction, $\epsilon(\mu)$, or dopant concentration, C, depending on the filter thickness, d. Otherwise that may cause blurring of the filter transmission cutoff (whereas the requirement for the filter transmission cutoff width to be 40 nm in the claimed laser is rather stringent), which would result either in overlapping of the $Er^{3+}$ ion excitation bands or in transmission of the pumping light UV component. The solid active medium doped with trivalent erbium ions ($Er^{3+}$) can be made in the form of either an integral (monolithic) or composite (assembled of cylinders, prisms, plates, discs, etc.) mono- or polycrystalline ceramic or glass active elements, active fibers or fiber bundles. The pumping light sources, including discharge lamps of any shape (flat, cylindrical, helical, coaxial, etc.) can be disposed outside the active medium (for example, near a cylindrical or composite active element or active fiber bundle), can surround the active medium (for example, when the active medium in the form of an element or a group thereof or a fiber bundle is mounted inside a helical or coaxial lamp), or can be disposed inside the active medium (for example, when a cylindrical lamp is mounted inside a coaxial element or a linear or helical fiber bundle).

The set task is also achieved by that used as a UV filter is a hard durable film of cerium compounds opaque in the short-wavelength light range and having appropriate filter coating transmission spectrum characteristics. For example, it can be a filter made in the form of a 0.3 to 1.5 μm thick hard durable film of cerium oxides carrying at least ⅔ of their stoichiometric composition as tetravalent cerium dioxide ($CeO_2$), which is deposited directly to the surface of the transparent material of the pumping light source envelope and/or optical component and/or active medium passed through by the pumping light. The use of such a layer of cerium oxides in a moderate average pumping power laser of any type, uncooled or cooled with organic coolants or air, allows to provide a minimum filter transmission cutoff width just within the 320 to 360 nm range. Due to the increased broadening of lines, in case Ce oxides are used, $Ce^{4+}$ ions with the absorption spectrum shifted into the UV region should be employed, which does not cause the absorption edge general shift because of the absorption line broadening beyond 360 nm. The substitution of more than ⅓ of the content for trivalent cerium oxide ($Ce_2O_3$) makes the transmission cutoff more gently sloping with the edge extending up to 400 nm. In this case, one of the main requirements for the filter density over the wavelength range of above 360 nm is not satisfied. However, to dispose of other cerium oxides completely is difficult technologically. Therefore, taking into consideration the spectral requirements, the filter should carry at least ⅔ of its composition as $CeO_2$, which provides both the required spectral characteristics and wide industrial applicability of the filter. An advantage of the claimed laser is the greatly widened allowable filtering layer thickness range, 0.3 to 1.5 μm, where the lower limit exceeds the layer thickness in the known devices. The upper limit of the thickness range is restricted for both spectral reasons (because of a possible transmission cutoff shift into the wavelength range above 360 nm) and technological reasons (because of a reduced durability of a thick film and an additional light loss over the entire range due to the photo-induced recrystallization of the film).

The set task is also achieved by providing conditions for light propagation from the pumping light source to the active medium at a minimum light loss at the interface between the cerium oxide film and the gaseous or liquid medium under the action of a high pulse pumpings light power.

For this purpose a transition layer in the form of a film of aluminum trioxide ($Al_2O_3$) of 0.3 to 1.0 μm in thickness and/or of silicon dioxide ($SiO_2$) of 0.5 to 1.0 μm in thickness is additionally deposited to the surface of the filter made in the form of a film of cerium oxides at the interface between thereof and the gaseous and/or liquid medium. In this case, the $Al_2O_3$ layer is deposited directly to the layer of cerium oxides, while the $SiO_2$ layer, either to the $Al_2O_3$ layer or to the layer of cerium oxides.

The refractive index of the film of cerium oxides is 2.1 to 2.3. Therefore, to prevent an additional light loss at the interface between thereof and the gaseous or liquid medium having a lower refractive index, 1.0 to 1.4, use should be made of a transition layer of one or two materials transparent to the erbium ion excitation light and having a refractive index depending on the refractive index of the contact medium. For example, if such a medium is air or a gas having a refractive index n=1, either a matching layer having a refractive index 1<n<1.3 or a composition of two matching layers having successively reducing refractive indices within the above specified range should be introduced to reduce the cerium oxides film - surrounding medium interface reflection light loss.

Since $Al_2O_3$ and $SiO_2$, having refractive indices n=1.69 and n=1.46, respectively, have no intrinsic absorption bands in the Er3+ ion excitation region, they fully satisfy, due to their thermo- and photo-stability and chemical inertness, all requirements to materials for matching layers.

To reduce the light interference loss in $Al_2O_3$ and/or $SiO_2$ layers, the layer thickness should exceed the length of the ray path in the material, which corresponds to the second interference maximum, or should be 1.5 times greater than the path length calculated from the first interference minimum for light with the maximum wavelength of the active ion excitation spectrum or the pumping light source radiation spectrum, respectively. The maximum wavelength for $Er^{3+}$-doped four-level lasers is 0.6 μm, and for three-level lasers, about 1.5 μm, but since the radiation spectra of discharge lamps are limited by a wavelength of about 1 μm, a wavelength of 1 μm is chosen for calculation in all cases. The path calculation should be performed for the normal light incidence at a minimum path length in the material since interference exhibits itself stronger in thinner layers, and for skew rays it is considerably attenuated. The creation of conditions under which interference suppression is provided at a minimum transition layer thickness for all wavelengths and angles of incidence of light allows to provide the transition layer efficiency regardless of the surrounding medium refractive index and angles of light passage in the reflector. An effectively "thick" layer in the most unfavorable case at the lowest surrounding medium refractive index of 1 is a layer having a thickness of 1.5 times greater than the path length calculated from the first interference minimum at a wavelength of 1 μm. For $SiO_2$ at a path length of 0.34 μm such is a layer of 0.51 μm in thickness. With allowance made for accuracy and adaptability to manufacture the minimum thickness of the $SiO_2$ layer is determined to be 0.5 μm. For $Al_2O_3$, an increase in the optical path length per unit of layer thickness proportional to an increase in the refractive index from 1.46 to 1.69 results in a decrease in the admissible minimum transition layer thickness to 0.3 μm, as compared to the $SiO_2$ layer.

The upper limit of the thickness of the $Al_2O_3$ and $SiO_2$ layers of 1.0 μm is determined by that a further increase in the thickness causes the layer recrystallization by radiation, which results in an increase in the light scattering loss and a decrease in the efficiency of light transfer from the pumping source to the active medium.

The set task is also achieved by using a liquid medium having filtering properties and containing cerium compounds, which is interposed between the pumping source and the active medium. This provides effective continuous operation of the $Er^{3+}$-doped laser at a high average pumping power.

The combination of a filter and a liquid medium provides uniform distribution of absorption centers over a thicker layer and allows a higher concentration thereof as compared to solid solutions (quartz and other glasses), without causing stresses and damages resulting from the filter heating by the absorbed UV light. Therefore, a liquid filter allows a greater specific pumping power as compared to glass or thin-film filters. The cerium absorption centers may be contained in the liquid base composition or in additives to it, due to which the required optical density of the filter is readily obtained over the wavelength range below 320 nm, and the transmission of waves of above 360 nm is provided by cleaning the medium from other ions. The liquid medium may be very viscous, for immersion of the active medium and/or the pumping light source in uncooled lasers, or may have a minimum viscosity, in case it is used as a coolant for cooling the light source and/or the active medium. The enhancement of the laser output energy and power is achieved by using the filtering liquid medium simultaneously as a coolant for cooling the high-power pumping light source and/or the active medium at a high output radiation power and for effective filtering the short-wavelength pumping radiation. For this purpose use can be made of cerium salts not containing oxygen and/or organic groups causing decomposition of cerium compounds and the removal of cerium in the form of precipitate or gels from the liquid medium, and, primarily, used as the liquid medium can be water solutions of cerium halide salts.

The use of a filtering liquid medium in the form of a water solution of trivalent cerium halides for isolating the active medium from the light source and as a liquid coolant provides the narrowest transmission cutoff just within the 320 to 360 nm spectral region. This is determined by the smallest broadening of Ce3+ absorption lines in water-solvated $Ce^{3+}$ salts, and the substitution of Ce3+ for $Ce^{4+}$ shifts the absorption band into the short-wavelength region, in which case a sufficient filter density over the 290 to 320 nm wavelength range, where light induces color centers based on iron ions, may be not provided.

The most effective is a solid-state laser comprising a liquid medium based on water solution of trivalent cerium chloride salts ($CeCl_3$) with a salt concentration of at least 0.4 M/l.

In some cases, when the presence of chlorine ions is intolerable for reason of corrosion ( for example, when vinyl chloride plastics are used in contact with a liquid medium containing chlorine ions), a practicable and sufficiently effective variant of the laser is a solid-state laser comprising a liquid medium based on a water solution of trivalent cerium bromide salts ($CeBr_3$) with a salt concentration of at least 0.4 M/l.

Since cold-resistant coolants for solid-state lasers may contain halide mixture solutions, used as a liquid medium in a laser may be a liquid medium based on a water solution of trivalent cerium chloride salts, which contains trivalent cerium bromide salts with a total concentration of cerium salts of at least 0.4 M/l.

A water-based solution used as a liquid medium in a laser allows introduction of other salts or organic additives required in each particular case without degradation of the required spectral properties, provided the water amount necessary for $CeCl_3$ and $CeBr_3$ is maintained.

It should be noted that the highest efficiency of the claimed invention becomes apparent in lasers using an $Er^{3+}$-doped active medium based on yttrium aluminate crystals ($YAlO_3$). In spite of hypersensitivity of the $YAlO_3:Er^{3+}$ crystals to UV radiation, this approach provides long-time serviceability of such lasers without a loss in the lasing efficiency. To do it by using another method is a complicated thing, especially when employing xenon pumping lamp pulses with a high specific power and a large UV component in the radiation spectrum.

Another effective variant is the use of an $Er^{3+}$-doped active medium based on yttrium-aluminum garnet (YAG) crystals ($YAG:Er^{3+}$).

Effectively used with the above described filters can be any active medium doped with ions the effective excitation wavelength range of which has a short-wavelength cutoff of not below 350 nm, for example with $Nd^{3+}$ ions ($YAlO_3:Nd^{3+}$ or $YAG:Nd^{3+}$).

Figure 2:
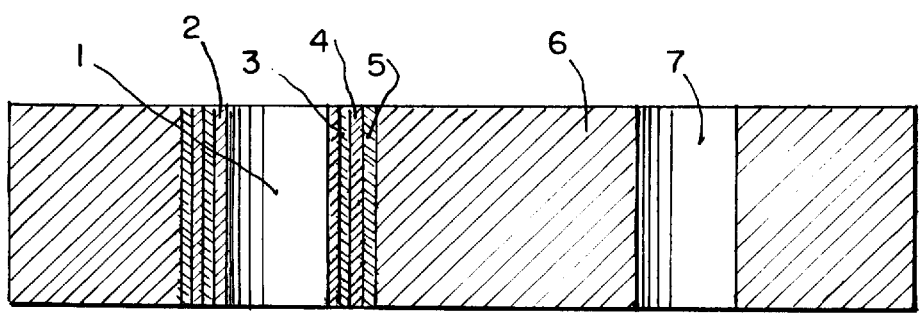
FIG. 2 is a cross-sectional elevation of the invention shown in FIG. 1.

FIGS. 1 and 2 illustrate a schematic and cross sectional elevation of a preferred embodiment of the present invention. A cylindrical pumping light source 1 is enveloped by a layer of transparent material 2. A filter film 3 of cerium oxides is deposited on the surface of the transparent material. The cerium oxides film 3 is generally 0.3–1.5 μm thick and has a stoichiometric composition comprising at least two-thirds $CeO_2$. A transition layer 4 in the form of a film of aluminum trioxide ($Al_2O_3$) having a thickness of 0.3 to 1.0 μm is deposited on the surface of the cerium oxides filter film. An additional transition layer 5 of silicon dioxide ($SiO_2$) is deposited on the surface of the aluminum trioxide. A liquid medium 6 having filtering properties and containing cerium compounds is interposed between the coated pumping source and the active medium 7 which is based on either of erbium-doped yttrium aluminate crystals or yttrium-aluminum garnet crystals. The liquid medium 6 is generally a water-based solution of cerium chloride ($CeCl_3$) or cerium bromide ($CeBr_3$) or a combination of both and wherein the total concentration of cerium salts is not less than 0.4 M/l.

VARIANTS OF THE EMBODIMENT OF THE INVENTION

When a laser design comprising a medium doped with $Er^{3+}$ ions is employed, a total thickness of filtering layers of cerium oxides of 1.0 to 1.5 μm is sufficient for removing the pumping light UV component, whereas the scattering loss in a thinner layer decreases due to the improved film quality. Therefore, the use of a filter in the form of two or three layers enhances the lasing efficiency.

In some cases it is advisable to use a coating of 0.5 to 0.8 μm in thickness deposited to two different surfaces of transparent media, for example, the pumping source envelope and the active medium, or to one or two walls of optical components between thereof.

The presence of if only a single optical component between the light source and the active medium increases the number of surfaces for depositing up to three or four coatings, and the thickness of the layer of cerium oxides in such cases can be reduced to 0.3 to 0.4 μm. This enhances the coating optical quality, strength and durability due to a further reduction of the thickness and improvement of the structure of the layer in the course of deposition and annealing at the filter total thickness of 1.2 to 1.6 μm. In this case, a coating of a greater total thickness (up to 6 μm) for use with the most UV-sensitive active elements of yttrium aluminate with a high erbium ion concentration can be readily realized, if required, by increasing the thickness of each film of cerium oxides up to 1.5 μm.

Thin layers are also applicable in case the pumping light source envelope is made of a filtering material containing cerium oxides ($CeO_2$ and $Ce_2O_3$). At a low admissible concentration of $CeO_2$ and/or $Ce_2O_3$ doped into quartz glass the latter has an enhanced transmittance in the wavelength region below 300 nm. Therefore, to increase the total filter density required to satisfy the spectral requirements to the laser, it is sufficient to use an additional layer not thicker than 1 μm, depending on the thickness and properties of the envelope glass.

To reduce the light interface loss, the most optimum when the contact medium is a gas or water is a coating comprising a 0.3 to 1.0 μm thick layer of $Al_2O_3$ having a refractive index n=1.69 and deposited directly to the layer of cerium oxides having a refractive index of 2.1 to 2.3 and a 0.5 to 1.0 μm thick layer of $SiO_2$ having n=1.46 and deposited, in its turn, to the $Al_2O_3$ layer. In this case, a noninterference coating having a stepwise reducing refractive index: namely, 2.3, 1.69, 1.46, 1.33–1.0, is formed which introduces the lowest light loss in the erbium ion excitation range.

In case the laser comprises a liquid medium having a refractive index n=1.4 to 1.5, it is sufficient to use a single transition layer of $Al_2O_3$ film having n=1.69 since a $SiO_2$ layer does not give a further reduction of loss and only impairs the filtering layer cooling. In cases the surrounding medium refractive index is 1.0 to 1.3 and matching of the thermal coefficient of expansion of the transition layer with that of the transparent medium material under the filtering film is required, it is advisable to use only a single $SiO_2$ layer deposited directly to the coating of cerium oxides. Such a variant can be effectively employed, for example, when a coating is deposited to the light source envelope quartz glass.

A concrete example of a laser design with a filter in the form of a coating is a solid-state laser based on erbium-doped yttrium aluminate and comprising a $CeO_2$ filter coating deposited to the pumping lamp and a $SiO_2$ transition layer. To obtain an optimum pumping light filtering, the thickness of the $CeO_2$ coating on the lamp envelope for operation with the erbium-doped active medium should be 1.0 to 1.5 μm with one of above described loss-reducing matching coatings consisting of a film of $SiO_2$ of 0.5 to 1.0 μm in thickness. In this case, the filter optical density in the $\lambda$<320 nm region exceeds 3, and at $\lambda$>360 nm is 0.08 to 0.1 with a sharp reduction to below 0.03 at $\lambda$=370 nm. An example of a variant of a laser design comprising a liquid filtering medium is a laser in which the active medium and the pumping light source are cooled with $CeCl_3$ water solution with a salt concentration of 4 to 6 M/l at a total thickness of the solution layer in the coolant channels around the active medium and/or the pumping light source of 3 to 1 mm. In this case, the filter transmission spectrum cutoff width is 30 nm, the density at $\lambda$=360 nm does not exceed 0.04 to 0.05, and in the spectral region below 320 nm, exceeds 3.

An experimental laser using $\phi$5*50 mm $YAlO_3:Er^{3+}$ elements and a xenon pumping lamp with a $\phi$3*45 mm discharge gap has been developed, in whose flat resonator with the output mirror transmission of 10 to 20% a threshold of 6 to 7 J at a differential efficiency of about 0.2% has been obtained. In this case, at a pumping energy of about 17 J an output energy exceeding 20 mJ at pulse repetition rates of 10 to 50 Hz has been obtained. In the world literature there have been no reports of intermittent lasing at such a threshold pumping energy, differential efficiency and pulse repetition rates at $\lambda=1.66$ $\mu$m simultaneously.

Similar high results have been obtained in lasers with an active medium in the form of several active elements and a pumping light source in the form of several straight discharge lamps at various combinations of the numbers of active elements and lamps. For example, to relieve load on the lamps at the operating active medium pumping exceeding the energy or power allowable per one lamp, the use was made of a laser configuration comprising two lamps and a single active element at the filtering variant with the use of water solution of $CeCl_3$ salt in the cooling jackets of both lamps and of the active element simultaneously.

In all above cited examples of laser designs the useful life of the active elements has increased by at least 100 fold, which fact allowed the laser continuous operation without a reduction of its output characteristics and without an increase in the lasing threshold at pulse repetition rates of up to 100 Hz.

Thus various variants of skin- and eye-safe lasers having a low threshold pumping energy and high efficiency and lasing pulse repetition rate and emitting at a wavelength of 1.6 to 1.8 $\mu$m have been devised.

Since the designs offered above are effective for lasing at a wavelength of 1.6 to 1.8 $\mu$m from the $^4S_{3/2}$ level within the $Er^{3+}$ ion level scheme above the $^4I_{11/2}$ level from which lasing at a wavelength of 2.7 to 3.0 $\mu$m takes place, they can be effectively used in lasers based on $Er^{3+}$-doped media at a lasing wavelength of 2.7 to 3.0 $\mu$m.

INDUSTRIAL APPLICABILITY

The present invention is applicable in sea and air transport, geodesy and cartography, signaling systems, environment monitoring, and in medicine.

The most successfully the invention can be embodied in the form of monopulse lasers emitting in the atmospheric transmittance region at wavelengths ranging between 1.5 and 1.8 $\mu$m and used for distance measurement and optical detection and ranging. The lasers emitting at wavelengths of between 2.7 and 3.0 $\mu$m are effective for application in medicine, including surgery.

We claim:

1. A solid-state laser comprising
   an active medium doped with trivalent erbium ions;
   a pumping light source with an envelope of a transparent material isolated from the active medium;
   an additional filtering layer comprising at least one of the group consisting of optical components, coatings deposited thereon, a liquid medium, isolating the transparent material;
   wherein the additional filtering layer is transparent to light over an excitation range of the active medium,
   and wherein the filtering layer over a full length of a ray path from the pumping source to the active medium, including a path in the envelope, is characterized by an optical density of at least 2, for wavelength ranges below 320 nm, and an optical density of not more than 0.1, for the active medium excitation spectral bands of wavelengths above 360 nm.

2. The solid-state laser of claim 1, further comprising a filter consisting of a thick, hard, durable film of cerium oxides of thickness between 0.3 and 1.5 $\mu$m, wherein the film has a stoichiometric composition having at least two-thirds tetravalent cerium dioxide ($CeO_2$), and wherein the film is deposited directly on a surface of at least one of the envelope of transparent material, the optical component and the active medium.

3. The solid-state laser of claim 2, further comprising a transition layer deposited on the surface of the film of cerium oxides, wherein the transition layer comprises aluminum trioxide ($Al_2O_3$), the transition layer having a thickness in the range 0.3–1.0 $\mu$m, and wherein the transition layer forms an interface between the film of cerium oxides and a gaseous or liquid medium.

4. The solid-state laser of claim 2, further comprising a layer of silicon dioxide ($SiO_2$), having a thickness in the range 0.5–1.0 $\mu$m, deposited on the surface of the film of cerium oxides, and wherein the layer of silicon dioxide forms an interface between the film of cerium oxides and a gaseous or liquid medium.

5. The solid-state laser of claim 3, further comprising a layer of silicon dioxide ($SiO_2$), having a thickness in the range 0.5–1.0 $\mu$m, deposited on the surface of the transition layer of aluminum trioxide, and wherein the layer of silicon dioxide forms an interface between the transition layer and a gaseous or liquid medium.

6. The solid-state laser of claim 1, wherein the liquid medium comprises cerium ion compounds.

7. The solid-state laser of claim 6, wherein the liquid medium comprises a solution of trivalent cerium chloride ($CeCl_3$) in water, the solution having a salt concentration of at least 0.4M/l.

8. The solid-state laser of claim 6, wherein the liquid medium comprises a water solution of trivalent cerium bromide ($CeBr_3$) in water, the solution having a salt concentration of at least 0.4 M/l.

9. The solid-state laser of claim 6, wherein the liquid medium comprises a solution of trivalent cerium bromide and trivalent cerium chloride in water, the solution having a total concentration of cerium salts of at least 0.4 M/l.

10. The solid-state laser of claim 1, wherein the active medium doped with trivalent erbium ions comprises yttrium aluminate crystals ($YAlO_3:Er^{3+}$).

11. The solid-state laser of claim 1, wherein the active medium doped with trivalent erbium ions comprises yttrium-aluminum garnet crystals ($YAG:Er^{3+}$).

12. A solid-state laser comprising
   an active medium doped with ions having an effective excitation wavelength range having a short-wavelength cutoff of at least 350 nm;
   a pumping light source with an envelope of a transparent material isolated from the active medium;
   an additional filtering layer comprising at least one of the group consisting of optical components, coatings deposited thereon, a liquid medium, isolating the transparent material;
   wherein the additional filtering layer is transparent to light over the excitation range of the active medium; and
   wherein the filtering layer over a full length of any ray path from the pumping source to the active medium is characterized by an optical density of at least 2 for wavelength ranges below 320 nm and an optical density of not more than 0.1 for the active medium excitation spectral bands of wavelengths above 360 nm.

* * * * *